United States Patent
Tian et al.

(10) Patent No.: US 9,439,091 B2
(45) Date of Patent: Sep. 6, 2016

(54) MIDPACKET DETECTION SCHEMES FOR CLEAR CHANNEL ASSESSMENT (CCA)

(71) Applicant: QUALCOMM Incorporated, San Diego, CA (US)

(72) Inventors: Bin Tian, San Diego, CA (US); Eugene Jong-Hyon Baik, San Diego, CA (US); Sameer Vermani, San Diego, CA (US); Tao Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 14/466,031

(22) Filed: Aug. 22, 2014

(65) Prior Publication Data

US 2015/0071215 A1    Mar. 12, 2015

Related U.S. Application Data

(60) Provisional application No. 61/874,972, filed on Sep. 6, 2013.

(51) Int. Cl.
*H04W 4/00* (2009.01)
*H04W 24/08* (2009.01)
*H04L 27/00* (2006.01)
*H04W 74/08* (2009.01)
*H04W 52/02* (2009.01)
*H04L 5/00* (2006.01)
*H04W 84/12* (2009.01)

(52) U.S. Cl.
CPC .......... *H04W 24/08* (2013.01); *H04L 27/0006* (2013.01); *H04W 52/0216* (2013.01); *H04W 52/0229* (2013.01); *H04W 74/0825* (2013.01); *H04L 5/001* (2013.01); *H04W 84/12* (2013.01)

(58) Field of Classification Search
CPC . H04W 28/04; H04W 72/04; H04W 72/042; H04W 88/08; H04L 5/0007
See application file for complete search history.

(56) References Cited

U.S. PATENT DOCUMENTS

| | | | |
|---|---|---|---|
| 7,403,539 B1 * | 7/2008 | Tang | H04W 24/00 370/445 |
| 8,411,807 B1 * | 4/2013 | Rangarajan | H04L 69/22 375/316 |
| 2004/0235439 A1 * | 11/2004 | Husted | H03G 3/3068 455/136 |
| 2008/0146172 A1 * | 6/2008 | Makhlouf | H04B 1/1027 455/114.2 |

(Continued)

OTHER PUBLICATIONS

Baik E (QUALCOMM): "LB288 PHY CID Resolutions for 24.3.18.5 ; 11-14-8189-82-88ah-lb288-phy-cid-resolutions-for-24-3-18-5", IEEE Draft; 11-14-8189-82-88AH-LB280-PHY-CID-RESOLUTIONS-FOR-24-3-18-5, IEEE-SA Mentor, Piscataway, NJ USA, vol. 882.11ah, No. 2, Jan. 21, 2014, pp. 1-11, XP068063681, [retrieved on Jan. 21, 2014] p. 2, last row-p. 3, first low of the table.

(Continued)

*Primary Examiner* — Melvin Marcelo
*Assistant Examiner* — Sanjay K Dewan
(74) *Attorney, Agent, or Firm* — Patterson & Sheridan, LLP

(57) ABSTRACT

Certain aspects of the present disclosure provide methods and apparatus for detecting ongoing transmissions and assessing channel state, based on midpacket detection. One example method generally includes receiving signals on a primary channel; detecting, based on the received signals, occurrence or non-occurrence of a first ongoing packet transmission on a primary channel; and generating at least one of a busy signal or an idle signal based on the detection. In this manner, collisions may be avoided.

14 Claims, 12 Drawing Sheets

(56) References Cited

U.S. PATENT DOCUMENTS

| | | | |
|---|---|---|---|
| 2010/0023085 A1* | 1/2010 | Wu | A61N 1/37276 607/30 |
| 2012/0314583 A1 | 12/2012 | Hart et al. | |
| 2013/0016642 A1 | 1/2013 | Banerjea et al. | |
| 2014/0169290 A1* | 6/2014 | Seok | H04W 74/006 370/329 |
| 2015/0003367 A1* | 1/2015 | Seok | H04W 74/002 370/329 |

OTHER PUBLICATIONS

International Search Report and Written Opinion—PCT/US2014/052491—ISA/EPO—Nov. 28, 2014.

Minyoung Park: "IEEE 802.11ac: Dynamic Bandwidth Channel Access", ICC 2011—2011 IEEE International Conference on Communications—Jun. 5-9, 2011—Kyoto, Japan, IEEE, Piscataway, NJ, USA, Jun. 5, 2011, pp. 1-5, XP031908841, D0I: 10.1109/ICC.2011.5963089ISBN: 978-1-61284-232-5 paragraph [II.A]-paragraph [II.B].

* cited by examiner

| Packet transmitted | 90% Detection SNR of signal of interest | Min Sensitivity (SNR within BW of interest) | Gap from 1dB desired Detection Margin over Min. Sensitivity | Achievable sensitivity using 2MHz GI detection (=min Sens. + Gap) |
|---|---|---|---|---|
| 2MHz PPDU | 2dB | 3dB | 0dB (desired) | -92dBm |
| Single 1MHz PPDU | 5dB @ 1MHz BW | 0dB | -6dB | -92dBm to 1MHz PPDU in 2MHz |
| 1MHz PPDU with -6dB adj. 1MHz interferer | 7dB @ 1MHz BW | 0dB | -8dB | -90dBm to 1MHz PPDU in 2MHz |
| 1MHz PPDU with -3dB adj. 1MHz interferer | 10dB @ 1MHz BW | 0dB | -11dB | -87dBm to 1MHz PPDU in 2MHz |

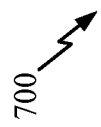

|  | 1MHz BW Detector | 2MHz BW Detector |
|---|---|---|
| Primary 2MHz | -92dBm | -92dBm |
| Primary 1MHz | -92dBm | //////// |

FIG. 10

| | 1MHz PPDU | 2MHz PPDU | 4MHz PPDU | 8MHz PPDU |
|---|---|---|---|---|
| Secondary 2MHz | | -82dBm /-72dBm | | |
| Secondary 4MHz | | -82dBm /-72dBm | -82dBm /-72dBm | |
| Secondary 8MHz | | -82dBm /-72dBm | -82dm /-72dBmB | -79dBm /-69dBm |

FIG. 11

MIDPACKET DETECTION SCHEMES FOR CLEAR CHANNEL ASSESSMENT (CCA)

CLAIM OF PRIORITY UNDER 35 U.S.C. §119

This application claims benefit of U.S. Provisional Patent Application Ser. No. 61/874,972, filed Sep. 6, 2013, which is herein incorporated by reference in its entirety.

BACKGROUND

1. Field of the Invention

Certain aspects of the present disclosure generally relate to wireless communications and, more particularly, to clear channel assessment (CCA) in wireless communication systems.

2. Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Aspects of the present disclosure generally relate to sensing ongoing transmissions (e.g., midpacket detection) on a wireless medium for clear channel assessment (CCA).

Certain aspects of the present disclosure provide an apparatus for wireless communications. The apparatus generally includes a receiver configured to receive signals on a primary channel and a processing system configured to detect, based on the received signals, occurrence or non-occurrence of a first on-going packet transmission on the primary channel and to generate at least one of a busy signal or an idle signal based on the detection.

Certain aspects of the present disclosure provide an apparatus for wireless communications. The apparatus generally includes means for receiving signals on a primary channel; means for detecting, based on the received signals, occurrence or non-occurrence of a first on-going packet transmission on the primary channel; and means for generating at least one of a busy signal or an idle signal based on the detection.

Certain aspects of the present disclosure provide a method for wireless communications. The method generally includes receiving signals on a primary channel; detecting, based on the received signals, occurrence or non-occurrence of a first on-going packet transmission on the primary channel; and generating at least one of a busy signal or an idle signal based on the detection.

Certain aspects of the present disclosure provide a computer program product. The computer program product generally includes a computer-readable medium having instructions stored thereon for receiving signals on a primary channel; detecting, based on the received signals, occurrence or non-occurrence of a first on-going packet transmission on the primary channel; and generating at least one of a busy signal or an idle signal based on the detection.

Certain aspects of the present disclosure provide a wireless node. The wireless node generally comprises at least one antenna; a receiver configured to receive, via the at least one antenna, signals on a primary channel; and a processing system. The processing system is typically configured to detect, based on the received signals, occurrence or non-occurrence of a first on-going packet transmission on the primary channel and to generate at least one of a busy signal or an idle signal based on the detection.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 is a table of example midpacket detection capability analysis for a 2 MHz simulation, in accordance with certain aspects of the present disclosure.

FIGS. 10 and 11 illustrate example CCA detection levels, in accordance with certain aspects of the present disclosure.

DETAILED DESCRIPTION

Figure 1:
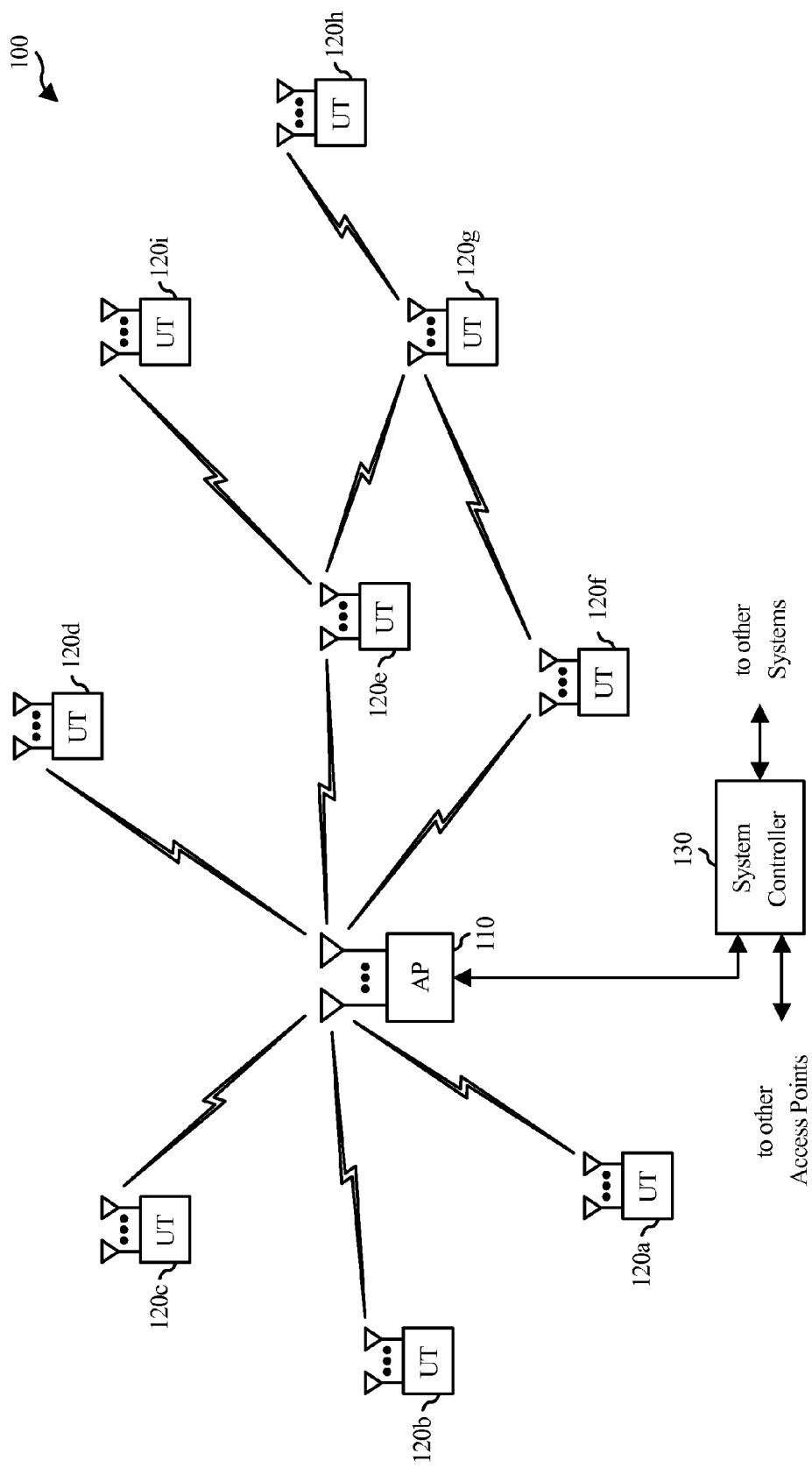
FIG. 1 illustrates an example wireless communications network, in accordance with certain aspects of the present disclosure.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof The acronyms listed below may be used herein, consistent with commonly recognized usages in the field of wireless communications. Other acronyms may also be used herein, and if not defined in the list below, are defined where first appearing herein.

ACK . . . Acknowledgement
A-MPDU . . . Aggregated MAC Protocol Data Unit
AP . . . Access Point
BA . . . Block ACK
BAR . . . Block ACK Request
CRC . . . Cyclic Redundancy Check
DCF . . . Distributed Coordination Function
DIFS . . . DCF Interframe Space
EOF . . . End of Frame
EIFS . . . Extended Interframe Space
FCS . . . Frame Check Sequence
ID . . . Identifier
IEEE . . . Institute of Electrical and Electronics Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Multiplexing
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QoS . . . Quality of Service
RDG . . . Reverse Direction Grant
S1G . . . Sub-1-GHz
SDMA . . . Spatial-Division Multiple Access
SIFS . . . Short Interframe Space
SIG . . . Signal
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network An Example Wireless Communication System The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
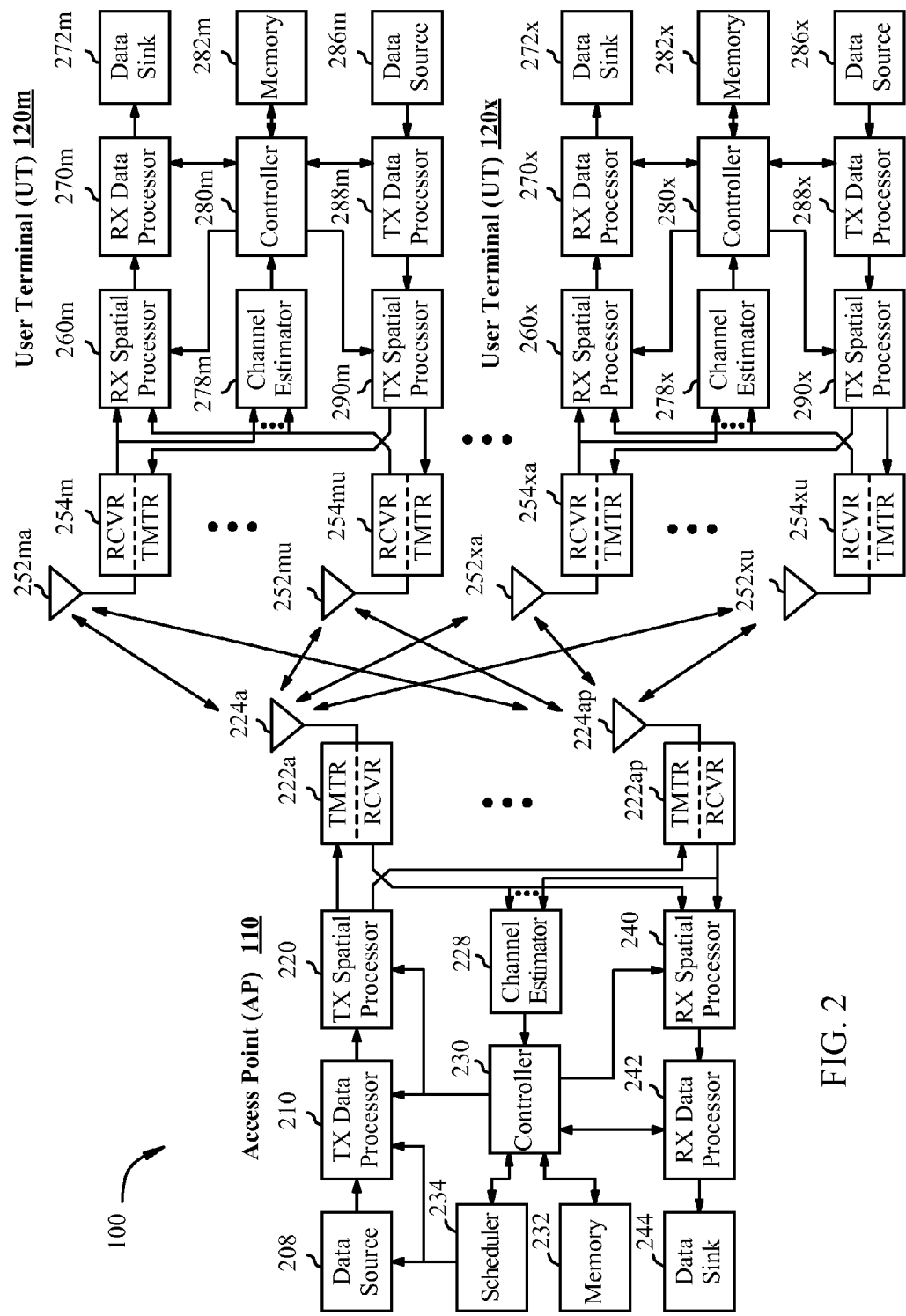
FIG. 2 is a block diagram of an example access point (AP) and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
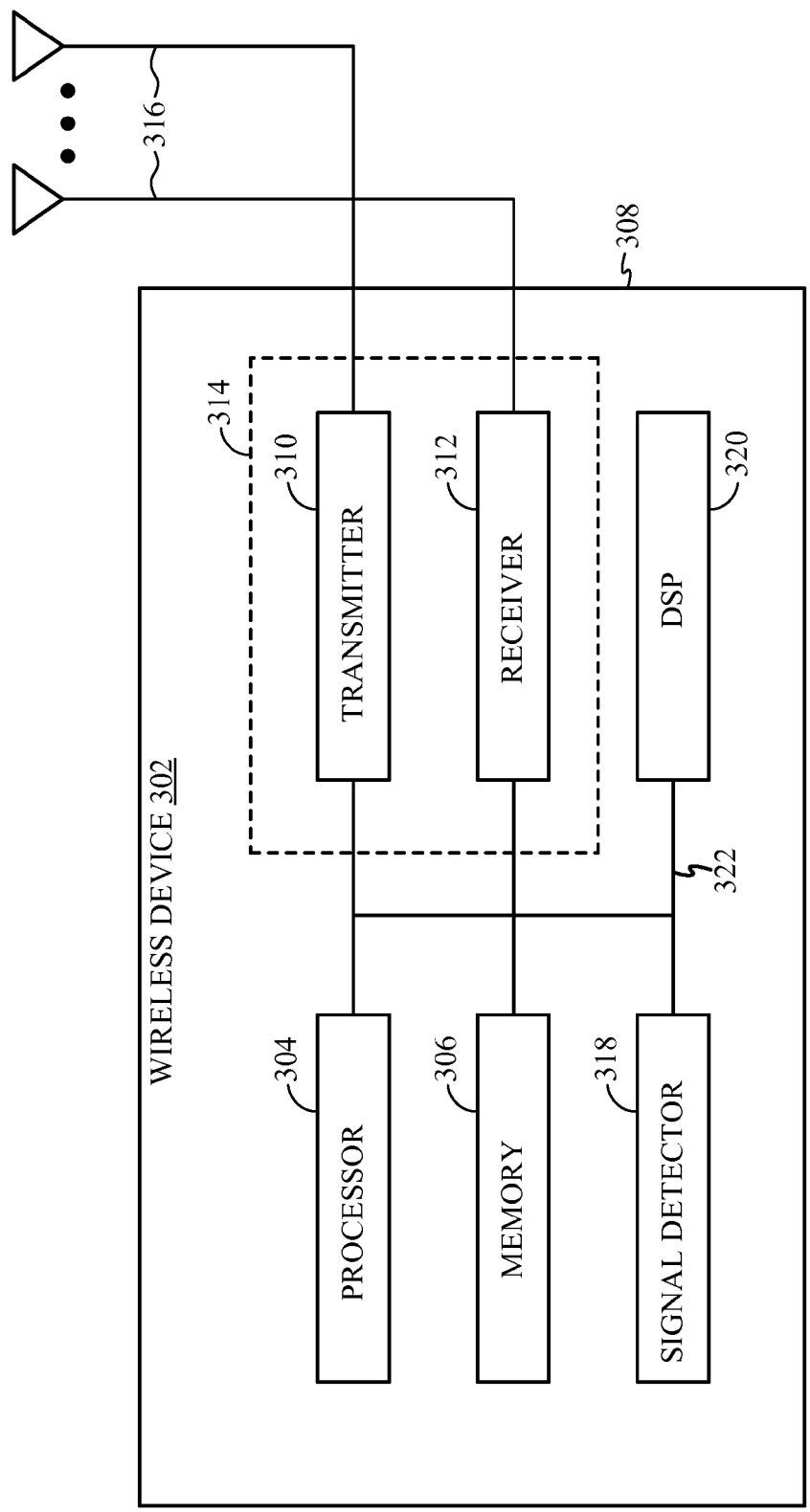
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Midpacket Detection Schemes for CCA

Also known as Sub-1-GHz (S1G), IEEE 802.11ah is an amendment to the IEEE 802.11 standard that allows for longer range in 802.11 networks. Various wireless systems including those complying with IEEE 802.11ac, 802.11ah, or 802.11ax (also known as HEW (High Efficiency WiFi or High Efficiency WLAN)) have schemes for clear channel assessment (CCA). In some cases, a CCA decision may be based on whether energy on a given channel is detected over a threshold value. In other cases, "carrier-sense" based CCA may base a CCA decision on whether an actual (e.g., 802.11) signal is detected. In some cases, carrier sense with energy detection may combine these schemes.

As used herein, a "primary channel" generally refers to a common channel of operation for all stations (STAs) that are members of a basic service set (BSS). As used herein, a "secondary channel" generally refers to another channel associated with the primary channel to create a channel with a wider bandwidth. For example, a primary 2 MHz channel may be combined with a secondary 2 MHz channel to create a 4 MHz channel.

In the IEEE 802.11ac amendment, primary channel CCA is performed by listening for the start of packets (e.g., preamble detection). In 802.11ah, however, many of the devices may be operating in power-save mode in which the devices sleep for a period and then wake up for transmissions. When such a device wakes up, the device typically performs CCA to check if the device can transmit. If the device happens to wake up during the middle of an ongoing packet transmission, however, this approach for CCA on the primary channel may not be able to detect the transmission because the device may have already missed the packet's preamble. Therefore, the CCA procedure may not be able to prevent collisions on the primary channel in this scenario.

Aspects of the present disclosure provide solutions which may allow for detection of packets, even in the event a device is just waking up from sleep. As used herein, the term "sleep" generally refers to a low-power state where some device functionality is disabled (e.g., Rx and/or Tx functionality). Upon waking up (exiting the low-power state), previously disabled functionality may be re-enabled.

According to certain aspects, a CCA scheme is provided whereby a device performs a midpacket detection (able to sense a packet even if it is too late to detect the preamble) procedure upon wake-up (e.g., out of power-saving sleep mode), to be able to sense that there are ongoing transmissions on the medium. In some cases, such a midpacket detection procedure may run iteratively during the backoff countdown period for primary channel CCA. Although the present disclosure refers mainly to midpacket detection for CCA in IEEE 802.11ah, such detection described herein may be similarly applicable to other wireless systems.

According to certain aspects, at wake-up, the device may perform midpacket detection and preamble detection simultaneously, and both may be required to be clear for the backoff countdown to proceed. Alternatively, to lessen the burden of performing additional checks of the primary channel, another option may involve performing this midpacket detection immediately upon waking up out of sleep mode. In this case, if midpacket detection does not initially sense an ongoing transmission, the regular primary channel CCA procedure for the device's backoff countdown may take over and continue the countdown. However, if midpacket detection senses an ongoing transmission, the primary channel CCA may be declared as busy (e.g., in this case the countdown may not proceed), and the midpacket detection routine may continue to run until it no longer senses an on-going transmission. At the point when midpacket detection is clear, the regular primary channel CCA routine may take over (and the midpacket detection procedure may stop running).

As used herein, "midpacket detection" generally refers to any suitable type of procedure capable of detecting the occurrence or non-occurrence of an on-going packet transmission. As used herein, the term "on-going packet transmission" generally refers to a packet transmission that is after the beginning of the preamble, such that preamble detection is not available.

Midpacket detection for primary channel CCA as presented herein may help address the following issues in systems, such as 802.11ah systems. For example, low-power devices coming out of sleep can miss starts-of-packets (preambles) and then transmit over ongoing transmissions, leading to collisions. Longer transmission durations in 802.11ah compared to other wireless systems (e.g., 802.11ac) further increase the likelihood of this. Furthermore, 1 MHz transmissions on the secondary 1 MHz within the primary 2 MHz are currently limited to the energy detection (E.D.) level of protection.

Figure 4:
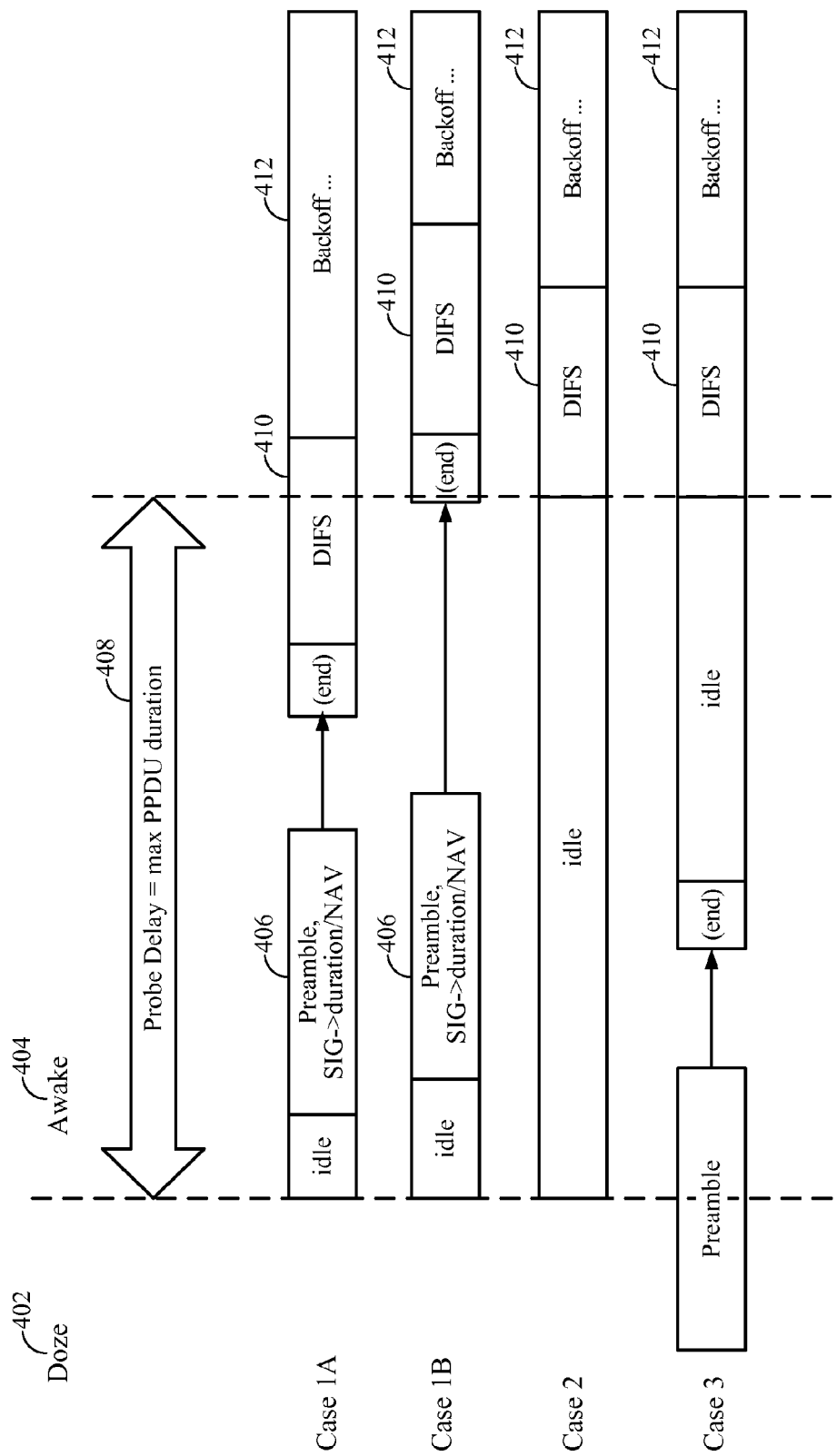
FIG. 4 illustrates example clear channel assessment (CCA) scenarios, in accordance with certain aspects of the present disclosure.

FIG. 4 illustrates example CCA scenarios, in which a device transitions from a low-power mode (e.g., sleep or doze mode 402) to an awake mode 404. As illustrated, when the device wakes up, the device may perform CCA until the device: (1) detects start-of-packet at 406 using the preamble, decodes the signal (SIG) field from the preamble, and defers for the length duration of the packet as determined from the SIG field (Case 1A, 1B); or (2) senses the wireless medium is idle for the full ProbeDelay duration 408 (Case 2), after which the device can start DIFS deferral at 410 and the backoff countdown at 412. The device may continue CCA for DIFS and backoff according to channel access rules.

However, there are a few issues with this approach. For example, the full ProbeDelay may be set equal to the maximum PPDU duration (e.g., 25 ms), which is quite long. If a device wakes up midpacket, the device may not detect the preamble or derive the length information. If the device does not detect a preamble after waking up, the device may have to wait the full ProbeDelay (Case 3) before transmitting. In addition, there is currently no enforcement of the ProbeDelay value. If the ProbeDelay value is set as 0 ms, DIFS starts immediately at wakeup and CCA during DIFS would miss ongoing packets, leading to potential collisions.

Figure 5:
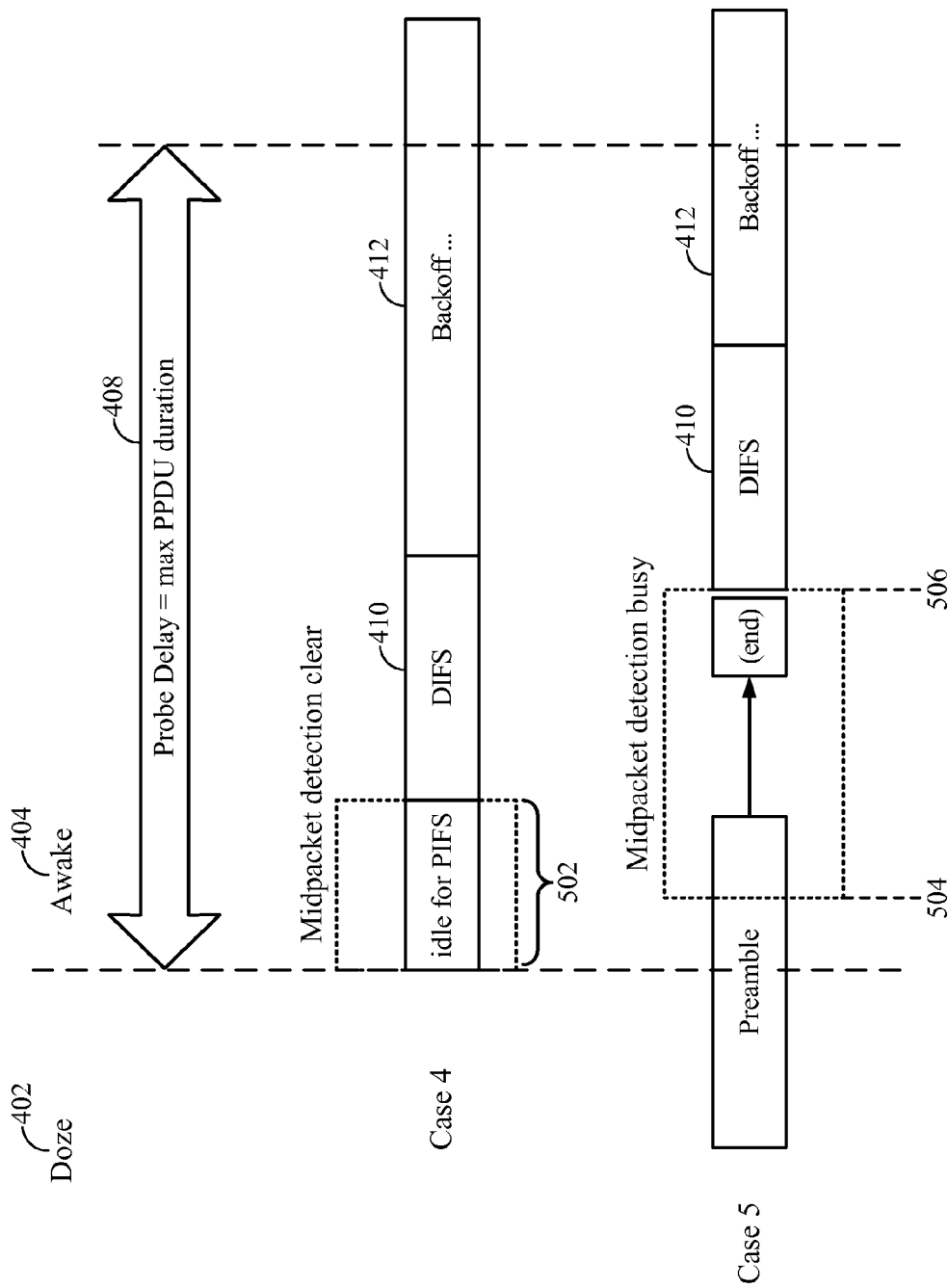
FIG. 5 illustrates example midpacket detection schemes for CCA, in accordance with certain aspects of the present disclosure.

Aspects of the present disclosure provide a CCA procedure on wake-up that addresses such issues. As illustrated in FIG. 5, upon wake-up, a device may perform midpacket detection in addition to the primary channel CCA right after wake-up, to sense for ongoing packet transmissions. If midpacket detection is clear for a PIFS duration 502 after waking up, the device may start DIFS 410 immediately (Case 4). If midpacket detection triggers (i.e., senses an ongoing packet transmission) at 504 after waking up, the device may start DIFS 410 after the detection "untriggers" (i.e., the ongoing packet transmission finishes, as in Case 5) at 506. In this manner, ongoing packet transmissions are respected: when the device starts DIFS 410, the device knows the wireless medium is clear of packets. In addition, devices waking up out of sleep do not have to wait for the full ProbeDelay duration 408 to know the medium is idle.

Figure 6:
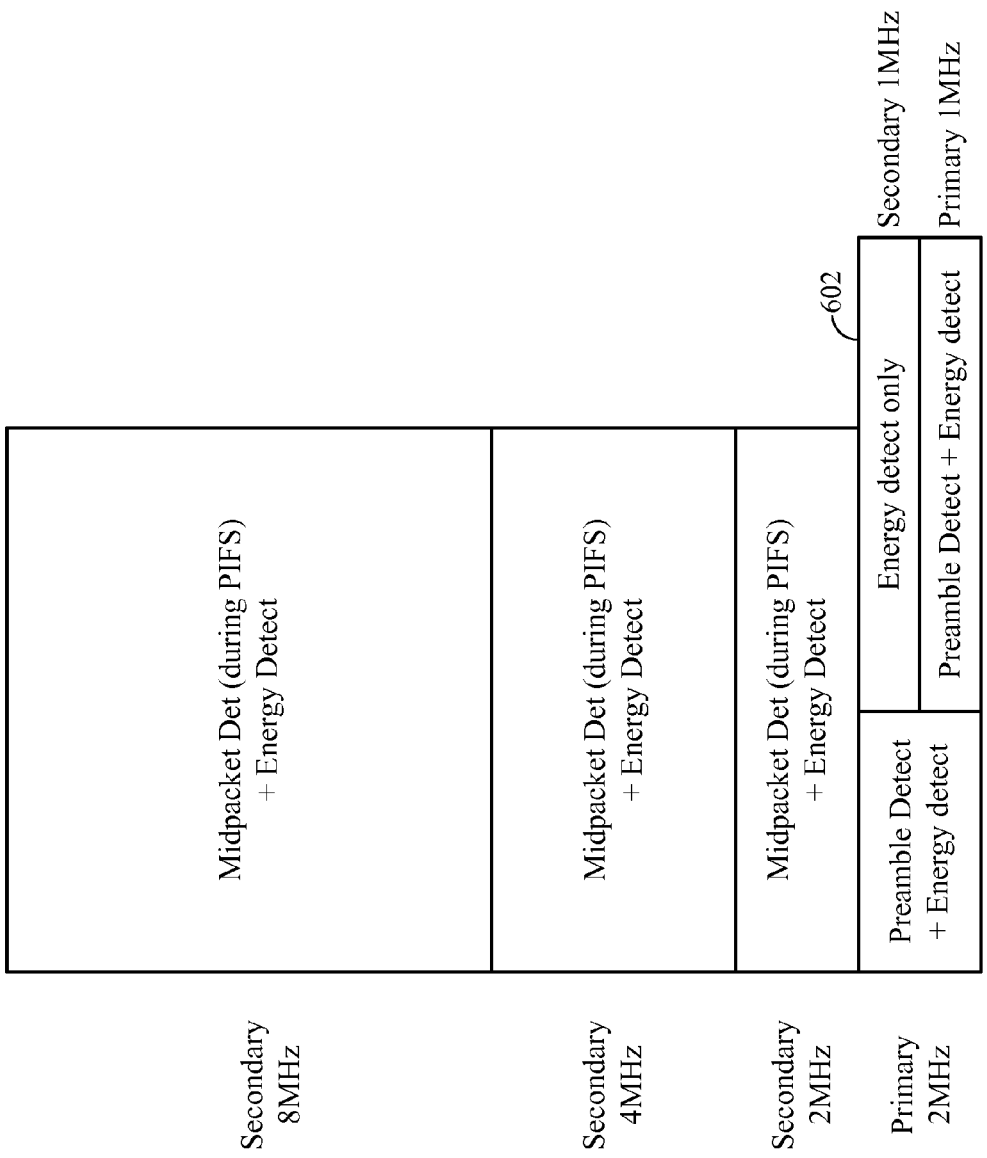
FIG. 6 illustrates example collision avoidance protection by using midpacket detection for secondary channels, in accordance with certain aspects of the present disclosure.

Aspects of the present disclosure may also provide midpacket detection for secondary channel (e.g., secondary 1 MHz) protection. As noted above, currently, secondary 1 MHz channel is limited to an E.D. level of protection as shown at 602 in FIG. 6. All other secondary channels (e.g., secondary 2 MHz, 4 MHz, and 8 MHz channels) get midpacket detection level protection (during PIFS check) in addition to energy detection. This may not be fair to 1 MHz Tx from an overlapping basic service set (OBSS) that fall in the secondary 1 MHz. Aspects of the present disclosure, however, may provide protection by adding midpacket detection over primary 2 MHz channel.

FIG. 7 is a table 700 of example midpacket detection capability analysis for a 2 MHz simulation, in accordance with certain aspects of the present disclosure. As illustrated, 2 MHz PPDUs may be detected to −92 dBm, at a level equivalent to 2 MHz minimum sensitivity. Standalone 1 MHz PPDUs may be detected reliably at −92 dBm, which is 6 dB above 1 MHz minimum sensitivity. Two asynchronous 1 MHz PPDUs in 2 MHz bandwidth (BW) may still be detected in many cases. If the two PPDUs are from a BSS and an OBSS, it is likely that the signal level difference between the two PPDUs≥3 dB (e.g., due to fading and pathloss difference from the OBSS). The techniques presented herein may detect the stronger 1 MHz PPDU at a level of −87 dBm.

Figure 8:
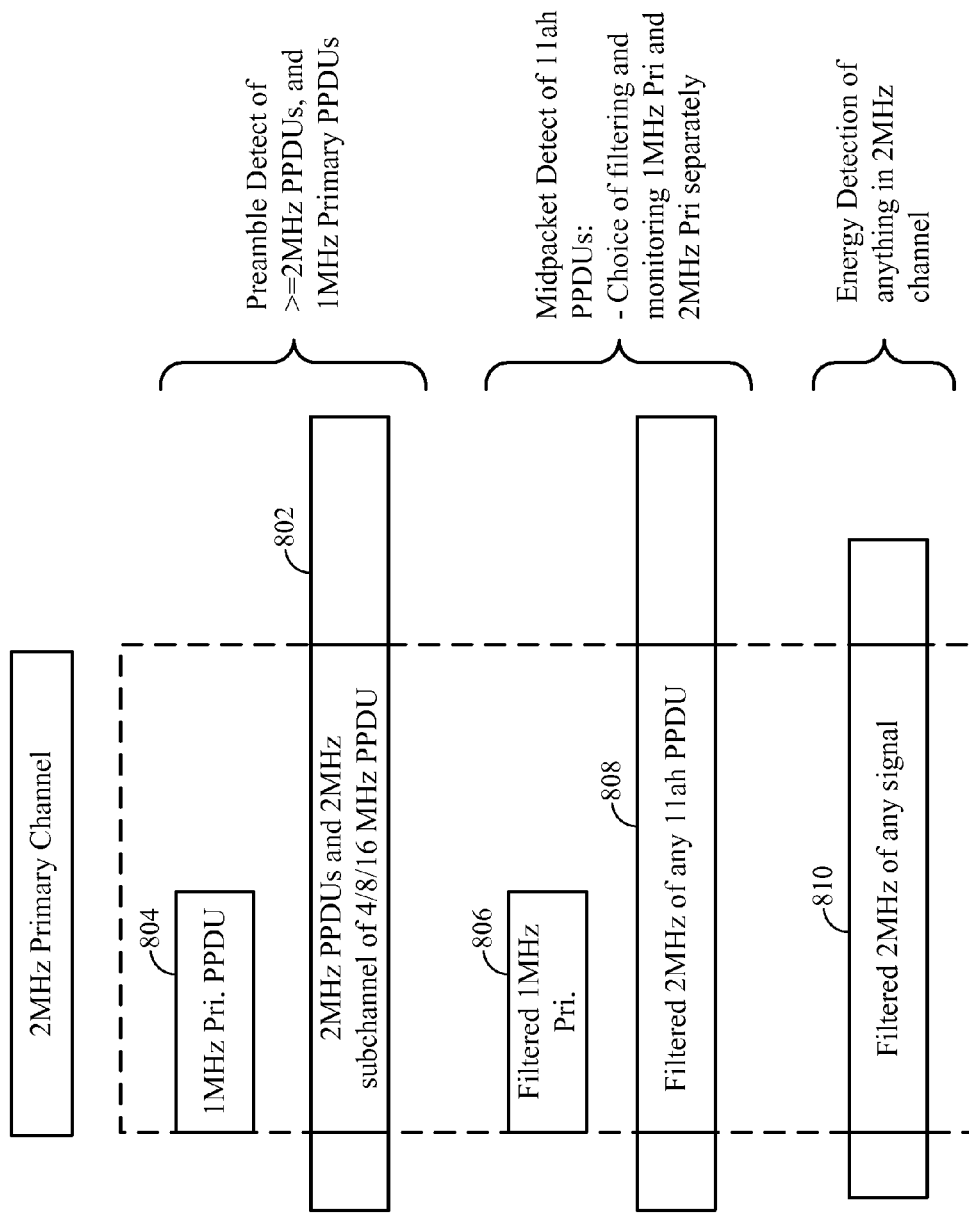
FIG. 8 illustrates example primary 2 MHz channel CCA criteria, in accordance with certain aspects of the present disclosure.

FIG. 8 illustrates example primary 2 MHz channel CCA criteria, in accordance with aspects of the present disclosure. A device may declare a busy condition if any check in FIG. 8 exceeds the corresponding CCA level. For example, the device may perform preamble detection of ≥2 MHz PPDUs 802 and 1 MHz primary PPDUs 804. Another check may include midpacket detection of 802.11ah PPDUs, which may involve filtering and monitoring the primary 1 MHz 806 and/or the primary 2 MHz 808. Yet another check may entail energy detection of any signal in the 2 MHz channel 810.

Midpacket detection may be performed at different times. According to a first option, a device may perform midpacket detection over a primary 2 MHz channel in a PIFS duration before the end of backoff. If the primary 2 MHz midpacket check returns busy (meaning the secondary 1 MHz is busy), the device may either re-perform backoff with a fresh backoff counter value or transmit on the primary 1 MHz (similar to the handling of other secondary channels). According to a second option, the device may perform midpacket detection as part of a CCA of the primary 2 MHz. In other words, the device may perform midpacket detection in addition to the typical preamble detection and energy level detection for the primary channel CCA at any suitable time, not just at wake-up. According to a third option, a device may perform midpacket detection right at wake-up (with no other modifications to primary or secondary CCA).

Figure 9:
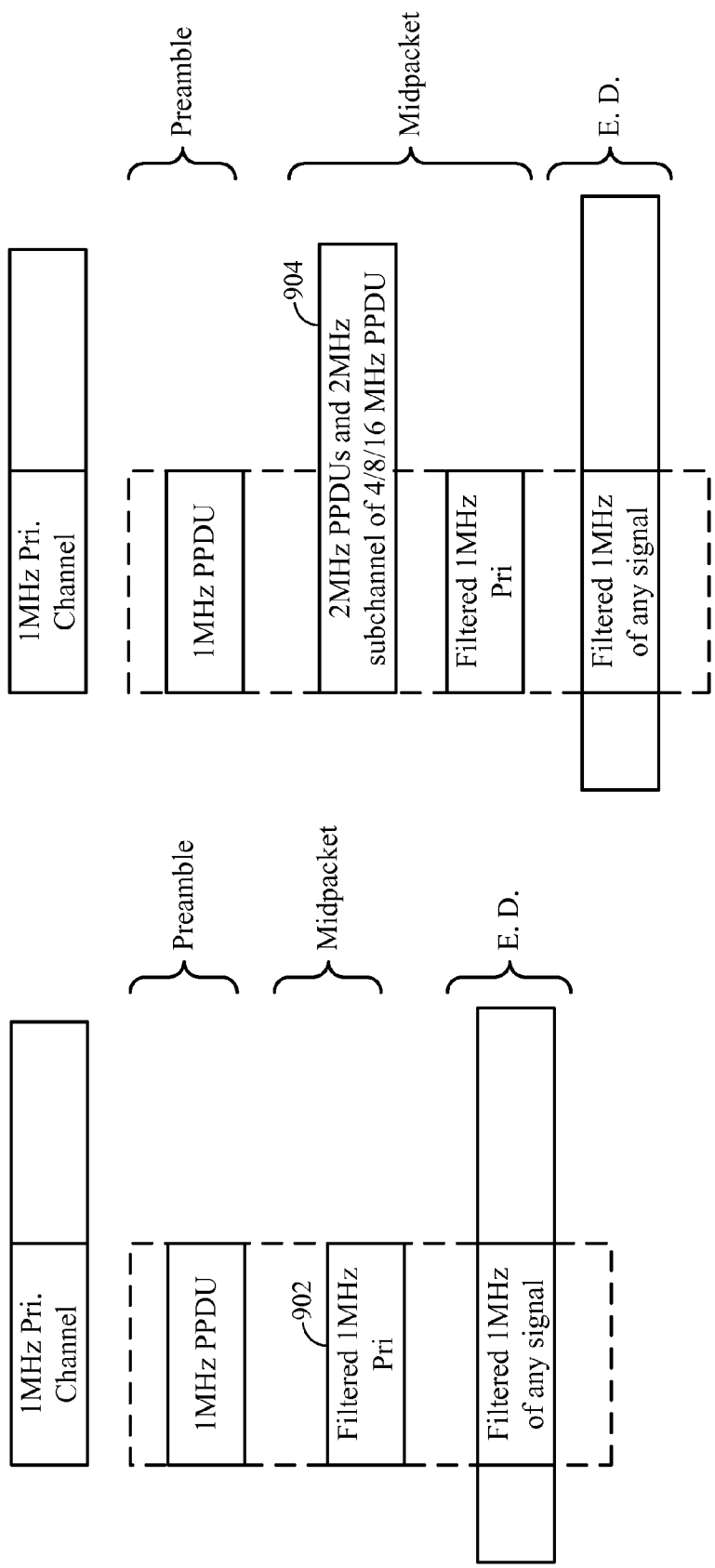
FIGS. 9A and 9B illustrate example primary 1 MHz channel criteria for declaring busy/idle conditions, in accordance with certain aspects of the present disclosure.

FIGS. 9A and 9B illustrate examples for declaring busy/idle conditions for a primary channel (e.g., 1 MHz channel for 802.11ah), in accordance with aspects of the present disclosure. According to a first option as illustrated in FIG. 9A, the device may use 1 MHz midpacket detection at 902 to cover ≥2 MHz PPDUs. According to a second option as illustrated in FIG. 9B, the device may explicitly detect for ≥2 MHz PPDUs through preamble detection and midpacket detection at 904.

FIGS. 10 and 11 are tables 1000, 1100 of example CCA detection levels, in accordance with certain aspects of the present disclosure. Table 1000 of FIG. 10 illustrates example midpacket CCA levels for Type 1 primary channels. For a 2 MHz BW midpacket detector, a −92 dBm threshold may achieve a −92 dBm level of sensitivity for 2 MHz PPDUs and a −92 dBm level of sensitivity for 1 MHz PPDUs (with possibly reduced sensitivity as described on asynchronous 2×1 MHz PPDU case of FIG. 7). For a 1 MHz BW midpacket detector, a −92 dBm threshold may achieve a −92 dBm level of sensitivity for 1 MHz PPDUs and a −89 dBm level of sensitivity for 2 MHz PPDUs. Table 1100 of FIG. 11 illustrates example midpacket CCA levels for Type 1 secondary channels.

Figure 12:
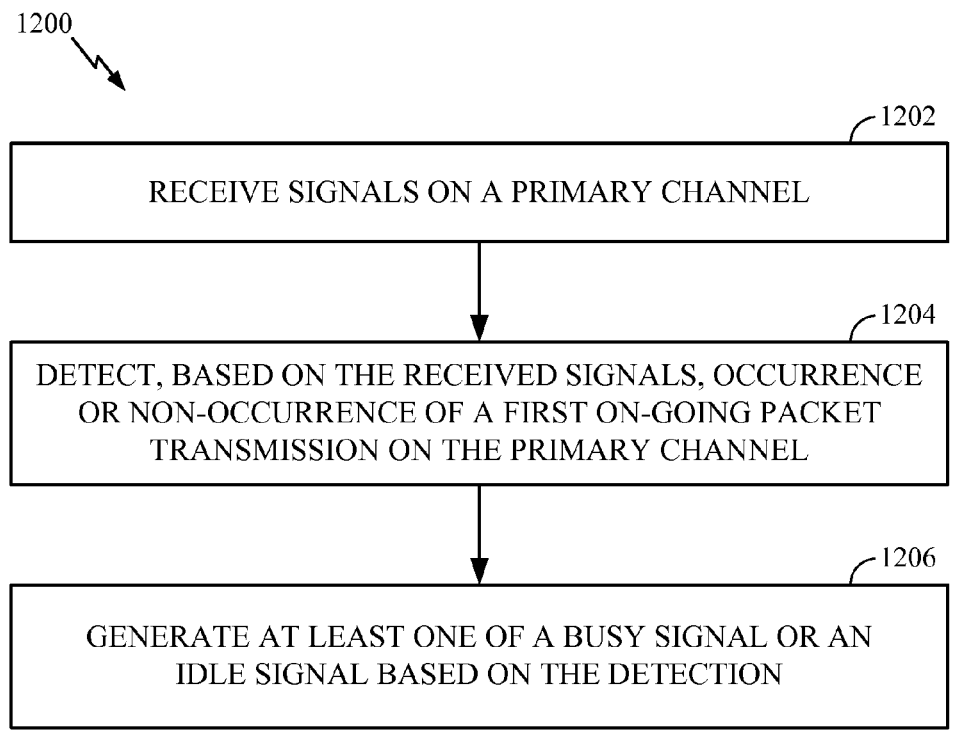
FIG. 12 is a flow diagram of example operations for performing midpacket detection, in accordance with certain aspects of the present disclosure.

FIG. 12 illustrates example operations 1200 for performing midpacket detection, in accordance with aspects of the present disclosure. The operations 1200 may be performed by an apparatus (e.g., a STA or AP). The operations 1200 may begin, at block 1202, with the apparatus receiving signals on a primary channel. At block 1204, the apparatus detects, based on the received signals, occurrence or non-occurrence of a first on-going packet transmission on the primary channel. The detection at block 1204 may involve filtering and monitoring the primary channel for the received signals being above a detection level. At block 1206, the apparatus generates at least one of a busy signal or an idle signal based on the detection at block 1204.

According to certain aspects, the detection may be performed as part of a CCA of the primary channel. In this case, the operations 1200 may further include performing preamble detection and energy level detection on the primary channel.

As noted above, in some cases, the detection may be performed upon waking up. In some cases, the detection may be performed upon waking up and subsequently during at least one of an interframe space period (e.g., a DIFS) or a countdown period. In such cases, a first detection level may be used when performing detection upon waking up, and a second detection level may be used when performing detection during at least one of an interframe space period or a countdown period. The first and second detection levels may range, for example, from −95 dBm to −82 dBm thresholds (preferably between −92 dBm and −85 dBm).

In some cases, the detection may be performed to detect occurrence or non-occurrence of a second on-going packet transmission on a secondary channel. In such cases, a first detection level may be used when performing detection for the primary channel, and a second detection level may be used when performing detection for the secondary channel. In this case, too, the first and second detection levels may range, for example, from −95 dBm to −82 dBm thresholds (preferably between −92 dBm and −85 dBm).

Figure 12A:
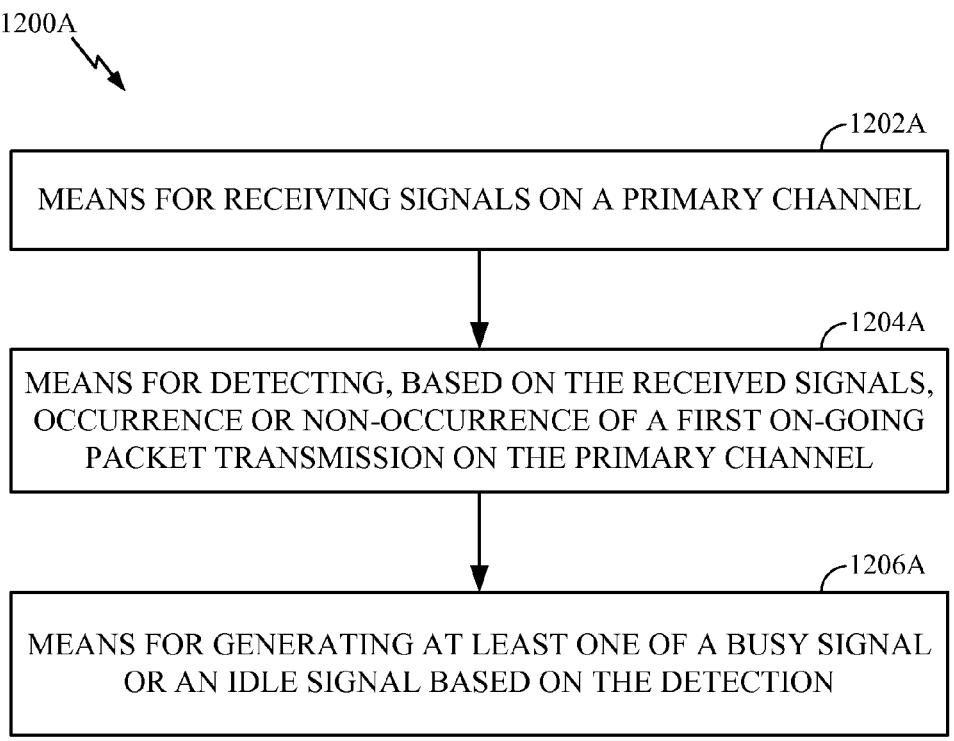
FIG. 12A illustrates example means capable of performing the operations shown in FIG. 12.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1200 illustrated in FIG. 12 correspond to means 1200A illustrated in FIG. 12A.

For example, means for receiving may comprise a receiver (e.g., the receiver unit 222) and/or an antenna(s) 224 of the access point 110 illustrated in FIG. 2 or the receiver 312 and/or antenna(s) 316 depicted in FIG. 3.

Means for processing, may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions). For example, an algorithm for detecting an on-going packet transmission may take, as input, samples of a received signal from a receiver and make a CCA decision (e.g., Idle/Busy) based on the samples (e.g., energy level, format, etc).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, a-b-c, and any number thereof.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a receiver configured to receive signals on a primary channel; and
   a processing system configured to:
      detect, based on the received signals, occurrence or non-occurrence of a first on-going packet transmission on the primary channel, wherein the processing system is further configured to detect occurrence or non-occurrence of a second on-going packet transmission on a secondary channel, and wherein a first detection level is used when performing detection for the primary channel and a second detection level is used when performing detection for the secondary channel; and
      generate at least one of a busy signal or an idle signal based on the detection.

2. The apparatus of claim 1, wherein the processing system is configured to perform the detection of occurrence or non-occurrence of the first on-going packet transmission as part of a clear channel assessment (CCA) of the primary channel.

3. The apparatus of claim 1, wherein the processing system is configured to perform the detection of occurrence or non-occurrence of the first on-going packet transmission on the primary channel upon waking up and subsequently during at least one of an interframe space period or a countdown period.

4. The apparatus of claim 3, wherein:
   the first detection level is used when performing detection of occurrence or non-occurrence of the first on-going packet transmission on the primary channel upon waking up; and
   a third detection level is used when performing detection of occurrence or non-occurrence of the first on-going packet transmission on the primary channel during the at least one of the interframe space period or the countdown period.

5. An apparatus for wireless communications, comprising:
   means for receiving signals on a primary channel;
   means for detecting, based on the received signals, occurrence or non-occurrence of a first on-going packet transmission on the primary channel, wherein the means for detecting is further configured to detect occurrence or non-occurrence of a second on-going packet transmission on a secondary channel, and wherein a first detection level is used when performing detection for the primary channel and a second detection level is used when performing detection for the secondary channel; and
   means for generating at least one of a busy signal or an idle signal based on the detection.

6. The apparatus of claim 5, wherein the means for detecting is configured to perform the detection of occurrence or non-occurrence of the first on-going packet transmission as part of a clear channel assessment (CCA) of the primary channel.

7. The apparatus of claim 5, wherein the means for detecting is configured to perform the detection of occurrence or non-occurrence of the first on-going packet transmission upon waking up and subsequently during at least one of an interframe space period or a countdown period.

8. The apparatus of claim 7, wherein:
   the first detection level is used when performing detection of occurrence or non-occurrence of the first on-going packet transmission on the primary channel upon waking up; and
   a third detection level is used when performing detection of occurrence or non-occurrence of the first on-going packet transmission on the primary channel during the at least one of the interframe space period or the countdown period.

9. A method for wireless communications, comprising:
   receiving signals on a primary channel;
   detecting, based on the received signals, occurrence or non-occurrence of a first on-going packet transmission on the primary channel, wherein detecting comprises detecting occurrence or non-occurrence of a second on-going packet transmission on a secondary channel, and wherein a first detection level is used when performing detection for the primary channel and a second detection level is used when performing detection for the secondary channel; and generating at least one of a busy signal or an idle signal based on the detection.

10. The method of claim 9, wherein the detecting of occurrence or non-occurrence of the first on-going packet transmission is performed as part of a clear channel assessment (CCA) of the primary channel.

11. The method of claim 9, wherein the detecting of occurrence or non-occurrence of the first on-going packet transmission is performed upon waking up and subsequently during at least one of an interframe space period or a countdown period.

12. The method of claim 11, wherein:
the first detection level is used when performing detection of occurrence or non-occurrence of the first on-going packet transmission on the primary channel upon waking up; and
a third detection level is used when performing detection of occurrence or non-occurrence of the first on-going packet transmission on the primary channel during the at least one of the interframe space period or the countdown period.

13. A non-transitory computer-readable medium having instructions stored thereon for:
receiving signals on a primary channel;
detecting, based on the received signals, occurrence or non-occurrence of a first on-going packet transmission on the primary channel, wherein detecting comprises detecting occurrence or non-occurrence of a second on-going packet transmission on a secondary channel, and wherein a first detection level is used when performing detection for the primary channel and a second detection level is used when performing detection for the secondary channel; and
generating at least one of a busy signal or an idle signal based on the detection.

14. A wireless node, comprising:
at least one antenna;
a receiver configured to receive, via the at least one antenna, signals on a primary channel; and
a processing system configured to detect, based on the received signals, occurrence or non-occurrence of a first on-going packet transmission on the primary channel and to generate at least one of a busy signal or an idle signal based on the detection, wherein the processing system is further configured to detect occurrence or non-occurrence of a second on-going packet transmission on a secondary channel, and wherein a first detection level is used when performing detection for the primary channel and a second detection level is used when performing detection for the secondary channel.

* * * * *